United States Patent [19]

Griffith, Jr.

[11] 4,257,651
[45] Mar. 24, 1981

[54] PNEUMATIC WHEEL AND METHOD OF MAKING SAME

[75] Inventor: William E. Griffith, Jr., Bedford, Pa.

[73] Assignee: Hedstrom Co., Bedford, Pa.

[21] Appl. No.: 68,942

[22] Filed: Aug. 23, 1979

[51] Int. Cl.³ .............................................. B60B 1/02
[52] U.S. Cl. ......................................... 301/58; 301/59; 29/159.02
[58] Field of Search .................. 301/11 R, 11 S, 54, 301/58, 59, 60, 61, 67, 70, 72, 73, 74, 78, 80, 84, 105 B, 95, 96; 29/159.02, 159.03, 159.1, 159.2

[56] References Cited

U.S. PATENT DOCUMENTS

| | | | |
|---|---|---|---|
| 1,161,491 | 11/1915 | McMullen | 301/67 |
| 2,209,030 | 7/1940 | MacDonald | 301/11 R |
| 3,008,770 | 11/1961 | Muellet | 301/58 |
| 3,431,025 | 3/1969 | Smith | 301/59 |

FOREIGN PATENT DOCUMENTS 1332603  6/1963  France ........................................ 301/58

*Primary Examiner*—H. Grant Skaggs
*Attorney, Agent, or Firm*—Cesari and McKenna

[57] ABSTRACT

An all-welded wire spoke wheel for a pneumatic tire includes a pneumatic tire rim formed with a relatively wide groove or depression in its inner face which extends all around the rim. An elongated metal strap is formed having a length, width and thickness approximating the circumference, width and depth of the rim groove. A series of spokes are welded endwise to that strap at spaced-apart locations therealong and then the strap is bent into a hoop with the spokes extending radially inward and seated snugly in the rim groove. After the hoop is secured to the rim at locations all around the rim, a wheel hub is welded conventionally to the radially inner ends of the spokes concentric with the rim.

9 Claims, 10 Drawing Figures

PNEUMATIC WHEEL AND METHOD OF MAKING SAME

This invention relates to an improved pneumatic wheel and method of making same. It relates more particularly to a wire spoke wheel of all-welded construction which is capable of carrying a pneumatic tire.

BACKGROUND OF THE INVENTION

All-welded wire spoke wheels have been in existence for well over 15 years. These are wheels whose spokes are welded at their outer ends to an annular rim and at their inner ends to a hub. The hub includes a central tube and a cap having an axially directed flange at each end of the hub. The inner ends of the spokes are positioned and welded between the edges of the caps and the ends of the tube. Examples of such wheels are disclosed in U.S. Pat. Nos. 3,251,978 and 3,431,025.

Heretofore, such wheels have been seriously disadvantaged because they can only be used to mount solid rubber tires. Consequently, the wheels can only be used for baby carriages, small tricycles and the like. It is not possible to use such prior solid tire wheels on the larger balloon tire bicycles which are so prevalent today. The reason for this is that, in order to mount a pneumatic tire on a wheel rim, the inner edges of the tire must end in circular beads which interfit with beads or flanges at the opposite edges of the so-called hook bead rim. This is necessary in order to enable the tire to contain an inflated innertube.

However, it has not proven feasible or practical to form the annular rim of such welded spoke wheels with the flanges or beads necessary to secure the tire. Past attempts to do this have resulted in defective wheels whose spokes are not properly welded to the rim or wheels which are unduly expensive and therefore not competitive in the marketplace with conventional non-welded spoke wheels for pneumatic tires. Thus despite all of the years such welded spoke wheels have been available and in use, no one has been able to adapt them economically to fit pneumatic tires.

SUMMARY OF THE INVENTION

Accordingly, the present invention aims to provide an improved all-welded wire spoke wheel.

It is a further object of the present invention to provide a wire spoke wheel of all-welded construction which can properly support a pneumatic tire.

Another object of the invention is to provide a wheel of this type which can be made of the requisite diameter and size to be used on the larger bicycles.

A further object of this invention is to provide a welded wire spoke wheel for a pneumatic tire which can be made relatively easily and inexpensively.

It is a further object of the invention to provide a method of making a wheel having one or more of the aforesaid advantages.

Other objects will, in part, be obvious and will, in part, appear hereinafter.

The invention accordingly comprises the sequence of steps and features of construction, combination of elements, and arrangement of parts which will be exemplified in the following detailed description, and the scope of the invention will be indicated in the claims.

Briefly, the wheel made in accordance with this invention is composed of two connected-together annular parts. The wheel has an outer annular rim which for the most part is identical to the outer rims used to make conventional wheels for pneumatic tires. That is, it is provided with the requisite hook beads at its edges which interlock with the mating beads on a conventional inflatable tire mounted on the rim. This rim is constructed in the conventional way from a flat sheet metal strip which is formed and rolled into a circle with its ends being welded together to form a ring. The rim differs from conventional ones, however, in that its radially inner surface is formed with a relatively wide groove or depression intermediate the side edges of the rim which groove or depression extends all around the inner face of the rim.

The second annular part of my wheel comprises a thin, flat, relatively narrow strap formed into a more or less circular hoop. Welded endwise at spaced-apart locations along the radially inner face of the strap are wire segments or spokes which extend radially inward toward the center of the hoop. In accordance with this invention, the width of the strap and the length thereof are such that when formed into a hoop, it can nest snugly in the groove or depression formed in the rim and when nested in that groove, the hoop conforms to the circular shape of the conventionally made outer rim. The hoop and rim are secured together by a series of welds or rivets spaced along the circumference of the rims or by other suitable means.

Once the hoop and rim are secured together concentrically as aforesaid, the wheel is completed more or less in the manner disclosed in the aforesaid patents. That is, the spokes are displaced out of the plane of the outer rim, alternate spokes being displaced to opposite sides of that plane. Then a cylindrical hub tube is positioned between the inner ends of the spokes concentric with the outer rim. Next, a pair of end caps having circular bearing openings and peripheral axially-extending skirts or flanges are positioned at the opposite ends of the hub tube so that the inner ends of the spokes are trapped between the edges of the cap flanges and the ends of the tube. Finally, the edges of the cap flanges are welded to the ends of the hub tube and the spokes all around the perimeter of the tube, thereby permanently securing the inner ends of the spokes to the capped hub tube, completing the wheel. A conventional pneumatic or balloon tire can then be installed on the wheel in the usual way so that its edge beads interlock with the flanges or beads at the opposite edges of the wheel outer rim.

Thus the present spoked wheel has all of the advantages of a conventional balloon or inflated tire wheel. Yet because it is of an all-welded construction, it can be manufactured quite easily and inexpensively using the conventional technique for making the outer rim portion of the wheel and the technique disclosed in the aforesaid patents for making the remaining portions of the wheel. Thus the trouble and expense of forming and installing wire spokes individually by hand in the usual way are completely avoided so that the wheel is quite competitive with conventional spoked wheels for balloon tires. Indeed, the existing machinery depicted in the aforesaid patents can be modified quite easily to enable it to fabricate balloon tire wheels in accordance with this invention.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENT

Figure 1:
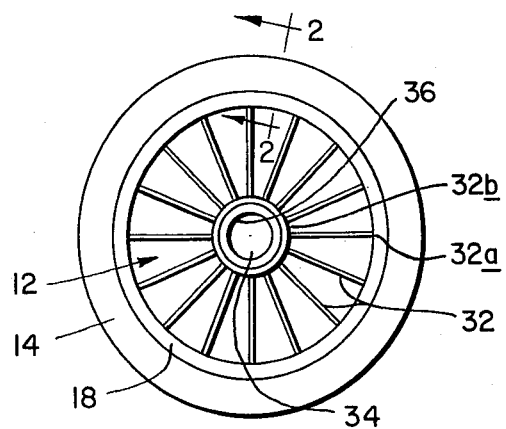
FIG. 1 is an elevational view of an all-welded wire spoke wheel for pneumatic tires made in accordance with this invention, showing the wheel fitted with a conventional such tire.
Figure 2:
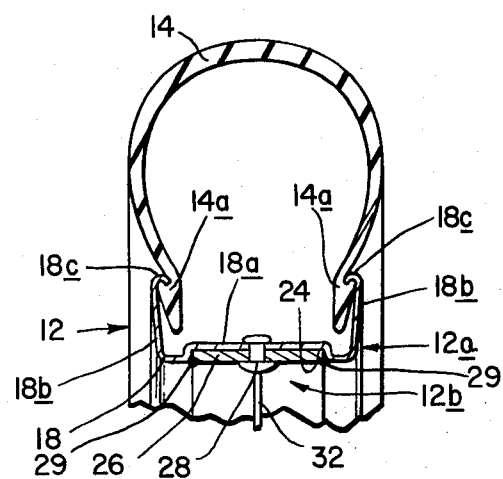
FIG. 2 is a sectional view on a larger scale along line 2—2 of FIG. 1.
Figure 3:
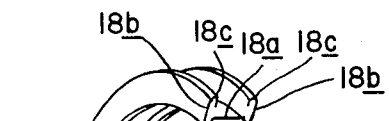
FIG. 3 is a perspective view with parts broken away showing a component of the FIG. 1 wheel in greater detail.

Referring to FIGS. 1 to 3 of the drawing, a wire spoke wheel of all-welded construction indicated generally at 12 is fitted with a conventional balloon tire 14. Captured between the wheel 12 and tire 14 is a standard inflatable inner tube (not shown).

As best seen in FIGS. 2 and 3, the wheel 12 is composed of two major sections, namely an outer circular rim indicated at 12a and an inner circular hoop shown generally at 12b, both sections being concentric and connected together. Rim 12a is rolled and formed from sheet metal stock in exactly the same way that the conventional rims for balloon tires are formed. More particularly the rim comprises an annular channel 18 having an axially extending section 18a and a pair of radially outwardly extending flanges 18b at each end of section 18a. The edges of flanges 18b terminate in peripheral hooks or beads 18c which project toward one another. Channel 18 is formed into a circular ring and its opposite ends are secured together by a weld bead 22 (FIG. 3) to form the finished rim 12a. In all of the aforesaid respects, then, rim 12a is exactly the same as a conventional balloon tire wheel rim.

The rim 12a differs considerably, however, in the cross sectional shape of its lengthwise or axially extending section 18a. As best seen in FIG. 2, section 18a is formed with a relatively wide radially outwardly extending groove or depression 24 centered between the ends of channel 18 and extending all around the circumference thereof. The width and depth of groove 24 is designed to seat the wheel section 12b as will be discussed presently.

Still referring to FIG. 2, section 12b includes a flat circular hoop 26 seated snugly in groove 24 in channel 18. Hoop 26 is secured to channel 18 by rivets 28 extending through the hoop and the groove 24 bottom wall at spaced-apart locations around the circumference thereof. Alternatively, those two components can be secured together by spot welds, two of which are shown at 29 in FIG. 2, by screws, by swaging the edges of groove 24 side walls over the edges of the hoop, or by spot punching through the rim and hoop so that the displaced rim material is driven through the punched hole in the hoop engaging the hoop from behind (or vice versa).

Projecting radially inward from hoop 26 is an array of spokes 32. Spokes 32 are welded at their outer ends 32a to hoop 26 at substantially equally spaced-apart locations around its circumference. The radially inner ends 32b of spokes 32 terminate at an imaginary circle C (FIG. 4c) whose diameter is appreciably less than that of hoop 26 but still relatively large e.g. on the order of 2½ to 4 inches depending on the size of the wheel.

As best seen in FIG. 1, the inner ends 32b of the spokes are welded to a cylindrical hub 34 which is concentric with channel 18. The construction of the hub 34 will be described in more detail later. Suffice it to say at this point that the hub is formed with a central bearing opening 36 for rotatively receiving a conventional axle.

The tire 14 is installed on wheel 12 in the usual way by positioning the tire about the wheel section 12a so that the projecting beads 14a at the radially inner edges of tire 14 interlock with the inwardly projecting beads or hooks 18c of channel 18 as shown in FIG. 2.

Thus the wheel depicted in FIGS. 1 and 2 is able to support a standard inflatable or balloon tire in the usual way. Yet the wheel itself can be made so as to have its spokes 32 welded between the wheel rim and hub 34, thereby saving the time and expense of forming and installing the spokes in the usual way by hooking them into the rim and hub. Further, the wheel itself is quite strong due to the double thickness or laminated construction of the wheel rim and due to the inclusion of the groove 24 which stiffens the rim and makes it more resistant to racking. Accordingly the wheel depicted in the drawing should find wide application on the larger balloon tire bicycles in widespread use today.

Figure 4:
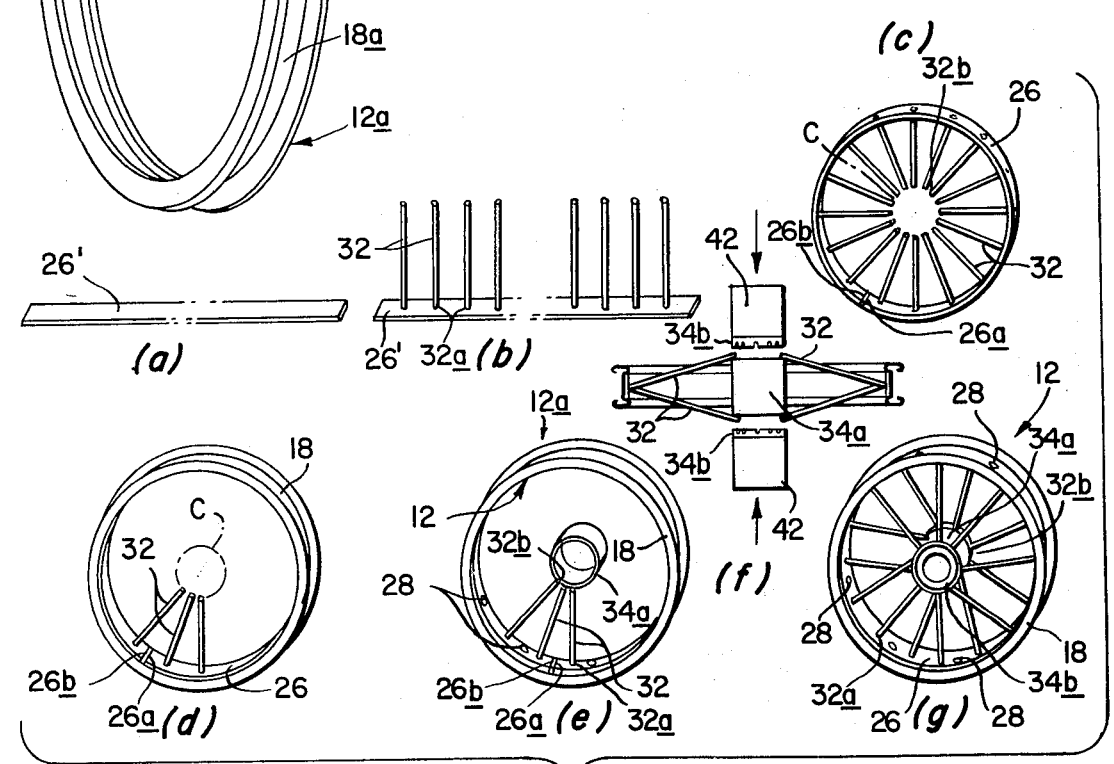
FIGS. 4a to 4g are perspective views showing the sequence of steps used to form the FIG. 1 wheel.

Turning now to FIGS. 3 and 4 of the drawing, the wheel 12 is formed in two different stages. The outer wheel section 12a is constructed in exactly the same way as conventional wheel rims for balloon tires, except that it is formed with the additional groove 24. Accordingly its mode of construction will not be described in detail here. The wheel section 12b on the other hand is formed more or less in accordance with the techniques disclosed in the aforesaid patents. First, a long, relatively narrow flat sheet metal strap 26' is dispensed from a roll of such material as in FIG. 4a. Then, several lengths of wire 32 are dispensed successively from a roll of such wire and positioned with the segment ends 32a butting against the face of strap 26' at equally spaced-apart locations therealong as illustrated in FIG. 4b.

Following this, the strap 26' is bent more or less into a circular hoop so that the spokes 32 point radially inward with their ends 32b terminating on the circumference of an imaginary circle indicated in dotted lines at C in FIG. 4c. The hoop ends 26a and 26b are not secured together and they may even overlap to some extent. Thus the hoop is split or discontinuous so that its diameter can be increased or decreased.

Referring now to FIG. 4d, the hoop 26 is now positioned in the groove 24 in channel 18, its diameter changing as needed to permit it to seat in the groove. When the hoop is properly seated in the groove, its concentricity is assured. Therefore, it is not necessary to take pains to bend the strap 26' into a perfect circle at the outset. Also the hoop ends 26a and 26b should not overlap. However, they may be spaced apart to a small extent without affecting the operation of the wheel. Next, the strap 26 and channel 18 are permanently secured together by rivets 28 extending through those members at spaced-apart locations all around the hoop. Alternatively, if desired, those two members may be connected together by spotwelds or by the ways described above.

In the same step or subsequently, a generally cylindrical hub tube 32a is positioned at the inner ends of spokes 32 concentric with channel 18. For this, the spokes 32 are displaced axially or out of the plane of the channel so that the inner ends 32b of alternate spokes engage on opposite ends of tube 34a as illustrated in FIG. 4c. Next, flanged hub caps 34b are positioned at opposite ends of the hub tube 34a beyond the inner spoke ends 34a as shown in FIG. 4f and welding shoes 42 are brought against the caps and manipulated so that the edges of the cap flanges are welded to the ends of the tube 34a all around the tube with the spokes being welded in place between those members as shown in that figure and described in detail in the aforesaid patents. The securement of the caps 34b to the hub tube 34a forms the completed wheel shown in FIG. 4g which may then be outfitted with a tube 14 as described above and illustrated in FIGS. 1 and 2.

As can be seen from the foregoing, the manufacture of the present wheel is accomplished for the most part using conventional techniques. With the exception of the steps of specially profiling the balloon tire-accepting channel 18 to nest a flat, welded spoke hoop and securing the hoop and channel together prior to installing the wheel hub, conventional techniques are employed.

Consequently, this mode of making a wheel enables for the first time an all-welded wire spoke wheel to accommodate a balloon or inflatable tire.

It will thus be seen that the objects set forth above, among those made apparent from the preceding description, are efficiently attained, and, since certain changes may be made in carrying out the above method and in the article set forth without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

What is claimed as new and desired to be secured by Letters Patent of the United States is:

1. An improved wheel for a pneumatic tire comprising
   A. an outer circular rim having
      1. a radially inner face and a radially outer face,
      2. a pair of radially outwardly extending tire-engagble flanges at the opposite ends of the rim, and
      3. a relatively wide groove formed in the inner face of the rim, said groove extending around the entire circumference of the rim,
   B. a substantially circular split hoop having a radially inner face and a radially outer face, the width and thickness of said hoop approximating those of the groove in the rim and the circumference of the hoop assuming that of the groove so that the hoop seats in the groove with the free ends of the hoop reposing adjacent one another,
   C. means for securing the hoop to the rim so as to form a laminated annular structure,
   D. an array of spokes having corresponding first ends welded to the radially inner face of the hoop at substantially equally spaced-apart locations around the circumference of the hoop, said spokes being oriented radially inward so that their opposite ends lie adjacent an imaginary circle whose axis substantially coincides with that of the rim,
   E. a hub located adjacent the radially inner ends of the spokes, said hub being substantially concentric with the rim, and
   F. means for connecting the radially inner ends of alternate spokes near or at opposite ends of the hub.

2. The wheel defined in claim 1 wherein the connecting means are welds between the spokes and the hub.

3. The wheel defined in claim 2 wherein the hub is composed of
   A. a tube positioned between the radially inner ends of alternate spokes, and
   B. a pair of flanged end caps welded to the ends of the tube with the inner spoke ends trapped between the caps and the tube.

4. The wheel defined in claim 1 wherein the means for connecting the hoop to the rim comprise a series of rivets spaced around the circumference of the hoop, and extending through the hoop and rim.

5. The wheel defined in claim 1 wherein the means for connecting the hoop and the rim comprise welds around the circumference of the hoop.

6. The method of making a wheel for a pneumatic tire comprising
   A. forming a circular pneumatic tire rim having radially outwardly extending tire engagable flanges at its opposite ends with a relatively wide radially outwardly extending groove in the inner face of the rim, said groove extending all around the circumference of the rim,
   B. forming an elongated metal strap having a length, width and thickness approximating the circumference, width and depth of said groove, the length of said strap being arranged so that, when the strap is formed into a circular hoop, the strap can seat in said groove with the strap ends being positioned adjacent one another,
   C. positioning a series of spokes at substantially equally spaced-apart locations along said strap so that the spoke first ends engage the face of the strap and the spokes extend substantially perpendicular to the strap,
   D. welding said spoke ends to the strap,
   E. bending the strap into a more or less circular hoop so that the spokes extend radially inward toward the center of the hoop,
   F. seating the strap in the rim groove,
   G. securing the strap to the rim so as to form a unitary laminated annular structure,
   H. deflecting the spokes axially out of the plane of the rim, alternate sets of spokes being deflected to opposite sides of that plane,
   I. positioning a hub tube between the inner ends of the spokes concentric with the rim so that alternate spokes engage alternate ends of the hub tube,
   J. positioning flanged hub caps having central axle openings so that the hub caps are coaxial with the hub tube and the edges of the flange are disposed in register with the tube ends with the spoke inner ends between them, and
   K. welding the cap flange edges to the ends of the tube and the spokes all around the circumference of the tube thereby completing the wheel.

7. The method defined in claim 6 wherein the strap is secured to the rim by welds.

8. The method defined in claim 6 wherein the strap is secured to the rim by a series of rivets.

9. The method defined in claim 6 and including the additional step of installing a pneumatic tire on the rim so that the tire inner edges interfit with the rim flanges.

* * * * *